US009648596B2

(12) United States Patent
Palanki et al.

(10) Patent No.: US 9,648,596 B2
(45) Date of Patent: May 9, 2017

(54) INTERFERENCE MITIGATION FOR CONTROL CHANNELS IN A WIRELESS COMMUNICATION NETWORK

(71) Applicant: QUALCOMM Incorporated, San Diego, CA (US)

(72) Inventors: Ravi Palanki, San Diego, CA (US); Aamod Khandekar, San Deigo, CA (US); Naga Bhushan, San Diego, CA (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 13/908,951

(22) Filed: Jun. 3, 2013

(65) Prior Publication Data

US 2013/0265968 A1  Oct. 10, 2013

Related U.S. Application Data

(63) Continuation of application No. 12/359,989, filed on Jan. 26, 2009, now Pat. No. 8,504,091.

(Continued)

(51) Int. Cl.
*H04W 52/24* (2009.01)
*H04W 72/04* (2009.01)
*H04W 72/08* (2009.01)

(52) U.S. Cl.
CPC ..... *H04W 72/0413* (2013.01); *H04W 52/244* (2013.01); *H04W 72/082* (2013.01); *Y02B 60/50* (2013.01)

(58) Field of Classification Search
CPC .............................. H04W 52/24; H04W 28/04

(Continued)

(56) References Cited

U.S. PATENT DOCUMENTS 3,916,112 A   10/1975 Kalat et al.
4,001,784 A   1/1977 Bardotti et al.
(Continued)

FOREIGN PATENT DOCUMENTS

CN   1520648 A   8/2004
EP   1091503 A2   4/2001
(Continued)

OTHER PUBLICATIONS

International Search Report and Written Opinion—PCT/US2009/032161, International Search Authority—European Patent Office—Jun. 25, 2009.

(Continued)

*Primary Examiner* — Hai V Nguyen
(74) *Attorney, Agent, or Firm* — Nerrie M. Zohn

(57) ABSTRACT

Techniques for mitigating interference on control channels in a wireless communication network are described. In an aspect, high interference on radio resources used for a control channel may be mitigated by sending a request to reduce interference to one or more interfering stations. Each interfering station may reduce its transmit power on the radio resources, which may then allow the control channel to observe less interference. In one design, a user equipment (UE) may detect high interference on radio resources used for a control channel by a desired base station. The UE may send a request to reduce interference on the radio resources to an interfering base station, which may reduce its transmit power on the radio resources. The UE may receive the control channel on the radio resources from the desired base station and may observe less interference from the interfering base station.

20 Claims, 6 Drawing Sheets

Related U.S. Application Data

(60) Provisional application No. 61/025,644, filed on Feb. 1, 2008, provisional application No. 61/080,039, filed on Jul. 11, 2008.

(58) Field of Classification Search
USPC .......................................... 455/522; 370/329
See application file for complete search history.

(56) References Cited

U.S. PATENT DOCUMENTS

| | | |
|---|---|---|
| 5,437,056 A | 7/1995 | Rautiola |
| 5,530,917 A | 6/1996 | Andersson et al. |
| 5,715,516 A | 2/1998 | Howard et al. |
| 5,828,963 A | 10/1998 | Grandhi et al. |
| 5,995,496 A | 11/1999 | Honkasalo et al. |
| 6,078,817 A | 6/2000 | Rahman |
| 6,088,335 A | 7/2000 | I et al. |
| 6,167,240 A | 12/2000 | Carlsson et al. |
| 6,236,365 B1 | 5/2001 | LeBlanc et al. |
| 6,278,701 B1 | 8/2001 | Ayyagari et al. |
| 6,330,459 B1 | 12/2001 | Crichton et al. |
| 6,374,112 B1 | 4/2002 | Widegren et al. |
| 6,418,148 B1 | 7/2002 | Kumar et al. |
| 6,438,356 B1 * | 8/2002 | Lilja .................. H04W 52/18 370/318 |
| 6,442,150 B1 | 8/2002 | Kondo et al. |
| 6,463,290 B1 | 10/2002 | Stilp et al. |
| 6,463,296 B1 | 10/2002 | Esmailzadeh et al. |
| 6,466,088 B1 | 10/2002 | Rezvani et al. |
| 6,519,465 B2 | 2/2003 | Stilp et al. |
| 6,609,001 B2 * | 8/2003 | Kline .................. H04B 17/309 455/423 |
| 6,711,403 B1 | 3/2004 | Herrmann et al. |
| 6,792,284 B1 | 9/2004 | Dalsgaard et al. |
| 6,845,088 B2 | 1/2005 | Terry et al. |
| 6,889,048 B1 | 5/2005 | Koo |
| 6,901,243 B2 | 5/2005 | Jayaraman et al. |
| 6,952,181 B2 | 10/2005 | Karr et al. |
| 6,968,186 B2 | 11/2005 | Pittampalli et al. |
| 7,010,317 B2 * | 3/2006 | Hwang .................. H04W 52/54 455/442 |
| 7,072,663 B2 | 7/2006 | Ramos et al. |
| 7,092,371 B2 | 8/2006 | Terry et al. |
| 7,092,732 B2 * | 8/2006 | Tamaki .................. H04W 74/02 370/338 |
| 7,103,364 B2 | 9/2006 | Ishikawa et al. |
| 7,130,637 B2 | 10/2006 | Fisher |
| 7,146,133 B2 | 12/2006 | Bahl et al. |
| 7,190,700 B2 | 3/2007 | Choi |
| 7,209,515 B2 * | 4/2007 | Kilfoyle ............... H04B 1/7103 375/152 |
| 7,212,826 B2 | 5/2007 | Fisher |
| 7,254,158 B2 * | 8/2007 | Agrawal ................ H04B 1/715 375/136 |
| 7,283,494 B2 | 10/2007 | Hammel et al. |
| 7,313,117 B2 | 12/2007 | Terry et al. |
| 7,327,697 B1 | 2/2008 | Friday et al. |
| 7,346,034 B2 | 3/2008 | Takano et al. |
| 7,373,162 B2 | 5/2008 | Farnham et al. |
| 7,379,755 B2 | 5/2008 | Nakayasu |
| 7,403,780 B2 | 7/2008 | VanLaningham et al. |
| 7,423,991 B2 | 9/2008 | Cho et al. |
| 7,424,268 B2 * | 9/2008 | Diener .................. H04L 1/0001 370/241 |
| 7,426,395 B2 | 9/2008 | Stephens |
| 7,453,861 B2 | 11/2008 | Leung et al. |
| 7,454,222 B2 | 11/2008 | Huang et al. |
| 7,460,846 B2 * | 12/2008 | Maalismaa .......... H04B 1/3805 455/168.1 |
| 7,512,411 B2 | 3/2009 | Moon et al. |
| 7,532,609 B2 | 5/2009 | Gross et al. |
| 7,586,888 B2 | 9/2009 | Wang |
| 7,593,356 B1 | 9/2009 | Friday et al. |
| 7,602,761 B2 | 10/2009 | Lin et al. |
| 7,623,879 B2 | 11/2009 | Honkanen et al. |
| 7,630,344 B1 * | 12/2009 | Kilfoyle ............... H04B 1/7103 370/334 |
| 7,630,736 B2 | 12/2009 | Wang |
| 7,639,610 B2 | 12/2009 | Yang et al. |
| 7,643,844 B2 * | 1/2010 | Kwak .................. H04W 52/343 455/127.1 |
| 7,715,430 B2 | 5/2010 | Ranta-Aho et al. |
| 7,720,485 B2 | 5/2010 | Jin et al. |
| 7,734,269 B2 | 6/2010 | Komulainen et al. |
| 7,756,041 B2 | 7/2010 | Whitehill et al. |
| 7,756,520 B2 | 7/2010 | Hashem et al. |
| 7,756,523 B2 | 7/2010 | Ebata |
| 7,760,644 B2 | 7/2010 | Bader |
| 7,778,151 B2 | 8/2010 | Bertrand et al. |
| 7,801,058 B2 | 9/2010 | Wang |
| 7,812,766 B2 | 10/2010 | Leblanc et al. |
| 7,817,997 B2 | 10/2010 | Nylander et al. |
| 7,826,796 B2 * | 11/2010 | Matsunaga ........... H04W 16/14 455/63.3 |
| 7,830,795 B2 | 11/2010 | Zimmerman et al. |
| 7,844,277 B2 | 11/2010 | Cheng et al. |
| 7,860,052 B2 | 12/2010 | Lohr et al. |
| 7,869,378 B2 | 1/2011 | Livet et al. |
| 7,869,801 B2 | 1/2011 | Goodjohn |
| 7,903,616 B2 | 3/2011 | Terry et al. |
| 7,912,021 B2 | 3/2011 | Barbaresi et al. |
| 7,912,081 B2 | 3/2011 | Heidari-Bateni et al. |
| 7,917,164 B2 * | 3/2011 | Rao ....................... H04W 52/10 455/522 |
| 7,920,888 B2 | 4/2011 | Beming et al. |
| 7,924,794 B2 | 4/2011 | Ballarini et al. |
| 7,961,702 B2 | 6/2011 | Salonidis et al. |
| 7,991,413 B2 | 8/2011 | Honkanen et al. |
| 8,005,046 B2 | 8/2011 | Salmenkaita et al. |
| 8,005,482 B2 | 8/2011 | Tolli et al. |
| 8,009,562 B2 | 8/2011 | Rayment et al. |
| 8,031,686 B2 | 10/2011 | Li et al. |
| 8,045,987 B2 | 10/2011 | Rudolf et al. |
| 8,050,222 B2 | 11/2011 | Maeda et al. |
| 8,068,785 B2 | 11/2011 | Ahn et al. |
| 8,072,929 B2 | 12/2011 | Frederiksen et al. |
| 8,077,640 B2 | 12/2011 | Li et al. |
| 8,081,592 B2 | 12/2011 | Sampath et al. |
| 8,099,099 B2 | 1/2012 | Laroia et al. |
| 8,099,504 B2 | 1/2012 | Cherian et al. |
| 8,107,962 B2 | 1/2012 | Parmar et al. |
| 8,107,964 B2 | 1/2012 | Nylander et al. |
| 8,145,221 B2 | 3/2012 | Garg et al. |
| 8,169,957 B2 | 5/2012 | Damnjanovic |
| 8,200,221 B2 | 6/2012 | Tolli et al. |
| 8,200,229 B2 | 6/2012 | Kaikkonen et al. |
| 8,218,504 B2 | 7/2012 | Yamamoto et al. |
| 8,243,667 B2 | 8/2012 | Chun et al. |
| 8,259,601 B2 | 9/2012 | Fu |
| 8,266,240 B2 | 9/2012 | Marjelund et al. |
| 8,279,824 B2 | 10/2012 | Chun et al. |
| 8,351,370 B2 | 1/2013 | Kim et al. |
| 8,351,949 B2 | 1/2013 | Fu |
| 8,385,294 B2 | 2/2013 | Ben-Eli |
| 8,452,316 B2 | 5/2013 | Sutivong et al. |
| 8,457,023 B2 * | 6/2013 | Norlen .................. H04W 16/14 370/281 |
| 8,504,091 B2 * | 8/2013 | Palanki ............. H04W 72/0413 455/522 |
| 8,537,774 B2 * | 9/2013 | Robson ................ H04W 36/04 370/331 |
| 8,599,705 B2 * | 12/2013 | Agrawal ............ H04W 72/082 370/252 |
| 8,700,083 B2 * | 4/2014 | Yavuz .................. H04W 52/40 370/318 |
| 8,712,461 B2 * | 4/2014 | Yavuz .................. H04W 52/40 370/318 |
| 2002/0037701 A1 * | 3/2002 | Lilja .................... H04W 52/18 455/63.1 |
| 2002/0061073 A1 | 5/2002 | Huang et al. |
| 2002/0107021 A1 | 8/2002 | Ishikawa et al. |
| 2002/0191573 A1 | 12/2002 | Whitehill et al. |

(56) References Cited

U.S. PATENT DOCUMENTS

| | | | |
|---|---|---|---|
| 2003/0003921 A1* | 1/2003 | Laakso | H04W 52/343 455/453 |
| 2003/0100312 A1* | 5/2003 | Takahashi | H04W 28/22 455/453 |
| 2003/0112786 A1 | 6/2003 | Terry et al. | |
| 2003/0210665 A1 | 11/2003 | Salmenkaita et al. | |
| 2003/0222819 A1 | 12/2003 | Karr et al. | |
| 2004/0053630 A1 | 3/2004 | Ramos et al. | |
| 2004/0127191 A1 | 7/2004 | Matsunaga | |
| 2004/0127259 A1 | 7/2004 | Matsunaga | |
| 2005/0083897 A1 | 4/2005 | Terry et al. | |
| 2005/0113106 A1* | 5/2005 | Duan | H04L 1/0002 455/452.2 |
| 2005/0143084 A1 | 6/2005 | Cheng et al. | |
| 2005/0163070 A1 | 7/2005 | Farnham et al. | |
| 2005/0169229 A1 | 8/2005 | Cho et al. | |
| 2005/0254513 A1* | 11/2005 | Cave | H04B 7/0408 370/445 |
| 2005/0277425 A1* | 12/2005 | Niemela | H04W 52/40 455/452.2 |
| 2006/0014554 A1* | 1/2006 | Gerlach | H04W 72/1231 455/501 |
| 2006/0025158 A1 | 2/2006 | Leblanc et al. | |
| 2006/0083161 A1 | 4/2006 | Laroia et al. | |
| 2006/0084460 A1* | 4/2006 | Matsuo | H04W 52/146 455/522 |
| 2006/0092881 A1 | 5/2006 | Laroia et al. | |
| 2006/0105773 A1 | 5/2006 | Lin et al. | |
| 2006/0206912 A1 | 9/2006 | Klarfeld et al. | |
| 2006/0212904 A1 | 9/2006 | Klarfeld et al. | |
| 2006/0234702 A1 | 10/2006 | Wiberg et al. | |
| 2006/0234752 A1* | 10/2006 | Mese | H04L 1/201 455/522 |
| 2006/0246907 A1 | 11/2006 | Kaikkonen et al. | |
| 2006/0274783 A1 | 12/2006 | Terry et al. | |
| 2006/0281462 A1 | 12/2006 | Kim et al. | |
| 2007/0006057 A1* | 1/2007 | Wallner | G11C 7/1006 714/763 |
| 2007/0025288 A1* | 2/2007 | Nagai | H04W 74/0816 370/329 |
| 2007/0037523 A1 | 2/2007 | Bi et al. | |
| 2007/0049316 A1 | 3/2007 | Beming et al. | |
| 2007/0060057 A1* | 3/2007 | Matsuo | H04B 1/0475 455/63.1 |
| 2007/0082619 A1* | 4/2007 | Zhang | H04W 52/143 455/69 |
| 2007/0082620 A1 | 4/2007 | Zhang et al. | |
| 2007/0099618 A1 | 5/2007 | Kim | |
| 2007/0105559 A1 | 5/2007 | Dillon et al. | |
| 2007/0105574 A1* | 5/2007 | Gupta | H04W 72/0406 455/509 |
| 2007/0109999 A1* | 5/2007 | Brunner | H04W 16/06 370/331 |
| 2007/0124494 A1 | 5/2007 | Harris | |
| 2007/0153735 A1 | 7/2007 | Frederiksen et al. | |
| 2007/0168326 A1 | 7/2007 | Das et al. | |
| 2007/0207828 A1* | 9/2007 | Cheng | H04W 16/04 455/522 |
| 2007/0211813 A1* | 9/2007 | Talwar | H04B 7/0417 375/267 |
| 2007/0243878 A1 | 10/2007 | Taira et al. | |
| 2007/0253355 A1 | 11/2007 | Hande et al. | |
| 2007/0253366 A1 | 11/2007 | Gabin et al. | |
| 2007/0280096 A1 | 12/2007 | Yanover et al. | |
| 2007/0280170 A1* | 12/2007 | Kawasaki | H04W 72/1231 370/331 |
| 2007/0297360 A1 | 12/2007 | Joachim et al. | |
| 2008/0008147 A1 | 1/2008 | Nakayama | |
| 2008/0013490 A1 | 1/2008 | Laroia et al. | |
| 2008/0014975 A1 | 1/2008 | Jin et al. | |
| 2008/0032731 A1 | 2/2008 | Shen et al. | |
| 2008/0039129 A1 | 2/2008 | Li et al. | |
| 2008/0057932 A1 | 3/2008 | Brunner | |
| 2008/0057995 A1 | 3/2008 | Komulainen et al. | |
| 2008/0062925 A1* | 3/2008 | Mate | H04W 52/244 370/331 |
| 2008/0080472 A1 | 4/2008 | Bertrand et al. | |
| 2008/0082981 A1 | 4/2008 | Kawaguchi et al. | |
| 2008/0089312 A1 | 4/2008 | Malladi | |
| 2008/0095103 A1 | 4/2008 | Goodjohn | |
| 2008/0096602 A1 | 4/2008 | Terry et al. | |
| 2008/0107074 A1 | 5/2008 | Salmenkaita et al. | |
| 2008/0133995 A1 | 6/2008 | Lohr et al. | |
| 2008/0144493 A1* | 6/2008 | Yeh | H04W 52/50 370/230 |
| 2008/0151832 A1 | 6/2008 | Iwasaki | |
| 2008/0166976 A1* | 7/2008 | Rao | H04W 52/10 455/69 |
| 2008/0171565 A1 | 7/2008 | Shan et al. | |
| 2008/0186892 A1 | 8/2008 | Damnjanovic | |
| 2008/0198785 A1 | 8/2008 | Huang et al. | |
| 2008/0233963 A1 | 9/2008 | Alanara et al. | |
| 2008/0253319 A1* | 10/2008 | Ji | H04W 16/02 370/328 |
| 2008/0260000 A1 | 10/2008 | Periyalwar et al. | |
| 2008/0268833 A1 | 10/2008 | Huang et al. | |
| 2009/0028059 A1 | 1/2009 | Barbaresi et al. | |
| 2009/0046632 A1 | 2/2009 | Nanda et al. | |
| 2009/0047931 A1 | 2/2009 | Nanda et al. | |
| 2009/0047971 A1 | 2/2009 | Fu | |
| 2009/0080386 A1 | 3/2009 | Yavuz et al. | |
| 2009/0080499 A1 | 3/2009 | Yavuz et al. | |
| 2009/0081970 A1 | 3/2009 | Yavuz et al. | |
| 2009/0082026 A1 | 3/2009 | Yavuz et al. | |
| 2009/0082027 A1 | 3/2009 | Yavuz et al. | |
| 2009/0086861 A1 | 4/2009 | Yavuz et al. | |
| 2009/0092059 A1 | 4/2009 | Fu | |
| 2009/0117933 A1 | 5/2009 | Umesh et al. | |
| 2009/0124205 A1* | 5/2009 | Aboba | H04B 17/382 455/63.1 |
| 2009/0130980 A1* | 5/2009 | Palanki | H04W 52/241 455/63.1 |
| 2009/0132674 A1 | 5/2009 | Horn et al. | |
| 2009/0132675 A1 | 5/2009 | Horn et al. | |
| 2009/0135754 A1 | 5/2009 | Yavuz et al. | |
| 2009/0135790 A1 | 5/2009 | Yavuz et al. | |
| 2009/0135796 A1 | 5/2009 | Nanda et al. | |
| 2009/0137221 A1 | 5/2009 | Nanda et al. | |
| 2009/0137241 A1 | 5/2009 | Yavuz et al. | |
| 2009/0143016 A1 | 6/2009 | Li | |
| 2009/0147748 A1 | 6/2009 | Ofuji et al. | |
| 2009/0168800 A1 | 7/2009 | Leinonen et al. | |
| 2009/0180435 A1 | 7/2009 | Sarkar | |
| 2009/0197538 A1* | 8/2009 | Borran | H04W 52/243 455/63.1 |
| 2009/0197588 A1 | 8/2009 | Khandekar et al. | |
| 2009/0197590 A1 | 8/2009 | Borran et al. | |
| 2009/0197629 A1* | 8/2009 | Borran | H04W 52/242 455/522 |
| 2009/0197631 A1* | 8/2009 | Palanki | H04W 72/0413 455/522 |
| 2009/0201868 A1 | 8/2009 | Chun et al. | |
| 2009/0227263 A1* | 9/2009 | Agrawal | H04W 16/16 455/452.1 |
| 2009/0252099 A1 | 10/2009 | Black et al. | |
| 2009/0275337 A1 | 11/2009 | Maeda et al. | |
| 2009/0296647 A1 | 12/2009 | Friday et al. | |
| 2010/0039948 A1 | 2/2010 | Agrawal et al. | |
| 2010/0202305 A1 | 8/2010 | Wijting et al. | |
| 2010/0202380 A1 | 8/2010 | Park et al. | |
| 2010/0211540 A9 | 8/2010 | Das et al. | |
| 2010/0240387 A1 | 9/2010 | Ezaki | |
| 2010/0254483 A1 | 10/2010 | Chun et al. | |
| 2010/0322160 A1 | 12/2010 | Yeh et al. | |
| 2011/0082881 A1 | 4/2011 | Chunilal | |
| 2011/0149915 A1* | 6/2011 | Terry | H04W 52/223 370/335 |
| 2011/0205899 A1* | 8/2011 | Hosein | H04L 12/5695 370/235 |
| 2011/0244887 A1 | 10/2011 | Dupray et al. | |

(56) References Cited

U.S. PATENT DOCUMENTS

| | | | | |
|---|---|---|---|---|
| 2011/0255515 A1* | 10/2011 | Maeda | ............... | H04W 36/18 370/331 |
| 2012/0026896 A1 | 2/2012 | Li et al. | | |
| 2014/0128123 A1* | 5/2014 | Matsunaga | ........... | H04W 16/14 455/522 |

FOREIGN PATENT DOCUMENTS

| | | | |
|---|---|---|---|
| EP | 1353455 A1 | 10/2003 | |
| EP | 1434364 A2 | 6/2004 | |
| EP | 1936829 A1 | 6/2008 | |
| JP | 8107382 A | 4/1996 | |
| JP | 2005537741 A | 12/2005 | |
| JP | 2006074811 A | 3/2006 | |
| JP | 2006340008 A | 12/2006 | |
| JP | 2008017325 A | 1/2008 | |
| JP | 2008061249 A | 3/2008 | |
| JP | 2008061250 A | 3/2008 | |
| JP | 2008529375 A | 7/2008 | |
| JP | 2010516184 A | 5/2010 | |
| KR | 20070094035 A | 9/2007 | |
| RU | 2004117213 | 3/2005 | |
| TW | 200723732 | 6/2007 | |
| WO | 9854853 A1 | 12/1998 | |
| WO | 9905878 A1 | 2/1999 | |
| WO | 0028758 A1 | 5/2000 | |
| WO | 02093757 A2 | 11/2002 | |
| WO | 02103920 A2 | 12/2002 | |
| WO | 03041287 | 5/2003 | |
| WO | WO-2004021604 A1 | 3/2004 | |
| WO | 2006007318 A1 | 1/2006 | |
| WO | 2006044718 | 4/2006 | |
| WO | 2006079689 A1 | 8/2006 | |
| WO | 2007047669 | 4/2007 | |
| WO | 2007051140 | 5/2007 | |
| WO | WO-2007072427 A1 | 6/2007 | |
| WO | 2008085936 A2 | 7/2008 | |
| WO | 2008120159 A2 | 10/2008 | |
| WO | 2009052754 A1 | 4/2009 | |

OTHER PUBLICATIONS

International Search Report—PCT/US09/032163, International Search Authority—European Patent Office—Jun. 25, 2009.
Nortel: "Adaptive Fractional Frequency Reuse", 3GPP Draft; R1-062150,3rd Generation Partnership Project (3GPP), Mobile Competence Centre ; 650, Route Des Lucioles ; F-06921 Sophia-Antipolis Cedex ; France, vol. RAN WGI , No. Tallinn; 20060823, Aug. 23, 2006.
Taiwan Search Report—TW098103320—TIPO—Feb. 28, 2012.
Written Opinion—PCT/US09/032163, International Search Authority—European Patent Office—Jun. 25, 2009.

* cited by examiner

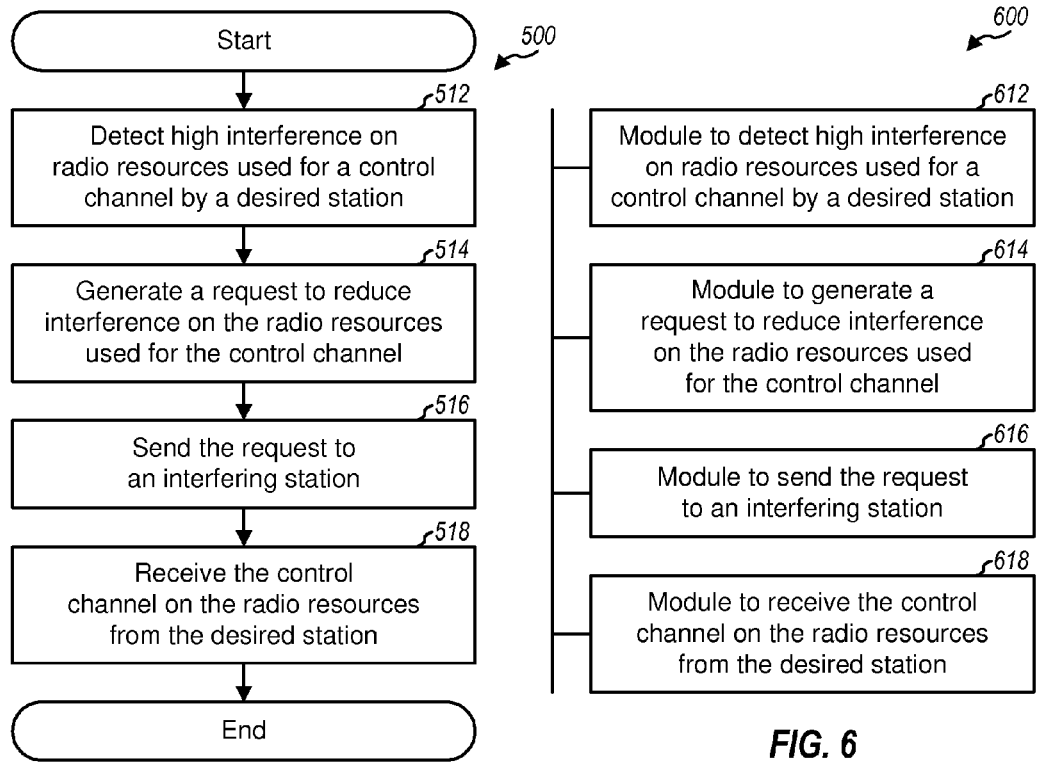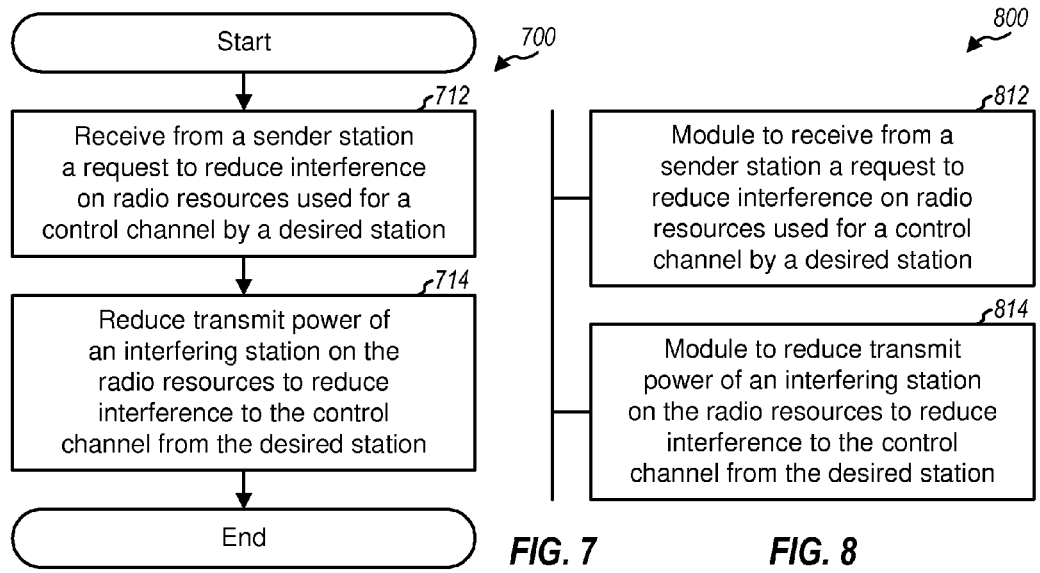

INTERFERENCE MITIGATION FOR CONTROL CHANNELS IN A WIRELESS COMMUNICATION NETWORK

The present application is Continuation Application U.S. application Ser. No. 12/359,989, filed Jan. 26, 2009, entitled INTERFERENCE MITIGATION FOR CONTROL CHANNELS IN A WIRELESS COMMUNICATION NETWORK which claims priority to provisional U.S. application Ser. No. 61/025,644, entitled "INTERFERENCE AVOIDANCE," filed Feb. 1, 2008, and provisional U.S. application Ser. No. 61/080,039, entitled "LIMITING INTERFERENCE ON CONTROL CHANNELS," filed Jul. 11, 2008, both assigned to the assignee hereof and incorporated herein by reference.

BACKGROUND

I. Field

The present disclosure relates generally to communication, and more specifically to techniques for mitigating interference in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control channels on the downlink to UEs and may receive data and control channels on the uplink from the UEs. On the downlink, a transmission from the base station may observe interference due to transmissions from neighbor base stations. On the uplink, a transmission from a UE may observe interference due to transmissions from other UEs communicating with the neighbor base stations. For both the downlink and uplink, the interference due to interfering base stations and interfering UEs may degrade performance.

There is therefore a need in the art for techniques to mitigate interference in a wireless network.

SUMMARY

Techniques for mitigating interference on control channels in a wireless communication network are described herein. In an aspect, high interference on radio resources (e.g., time-frequency resources) used for a control channel may be mitigated by sending a request to reduce interference to one or more interfering stations. Each interfering station may reduce its transmit power on the radio resources, which may then allow the control channel to observe less interference.

In one design of interference mitigation on the downlink, a UE may detect high interference on radio resources used for a control channel by a desired base station. The UE may generate a request to reduce interference on the radio resources used for the control channel and may send the request to an interfering base station, which may reduce its transmit power on the radio resources. The UE may receive the control channel on the radio resources from the desired base station and may observe less interference from the interfering base station.

Interference mitigation on the uplink may occur in similar manner, as described below. Various aspects and features of the disclosure are also described in further detail below.

BRIEF DESCRIPTION OF THE DRAWINGS

FIG. 5 shows a process for sending a reduce interference request.

FIG. 6 shows an apparatus for sending a reduce interference request.

FIG. 7 shows a process for receiving a reduce interference request.

FIG. 8 shows an apparatus for receiving a reduce interference request.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
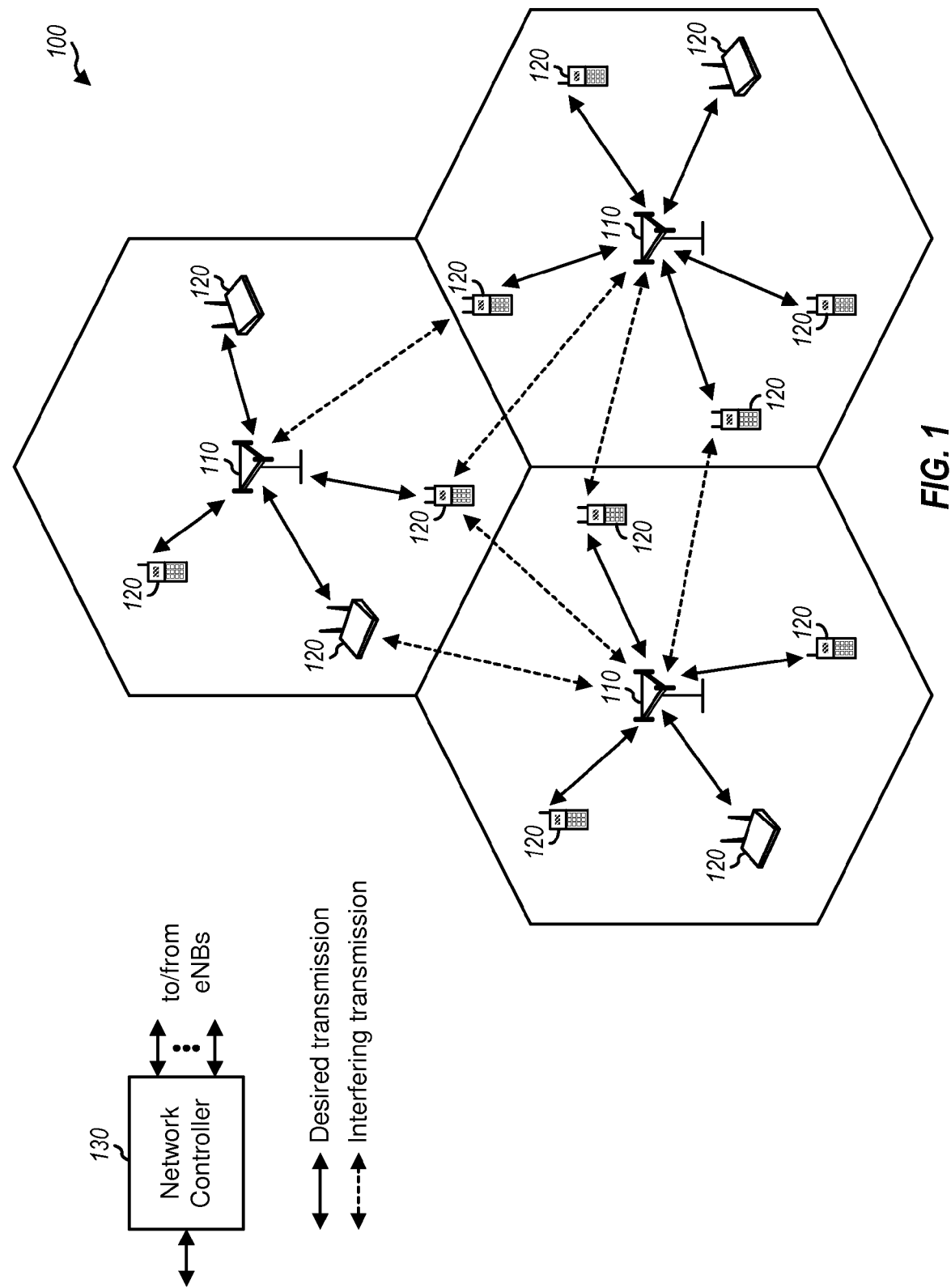
FIG. 1 shows a wireless communication network.

FIG. 1 shows a wireless communication network 100, which may be an LTE network or some other network. Wireless network 100 may include a number of evolved Node Bs (eNBs) 110 and other network entities. An eNB may be a station that communicates with the UEs and may also be referred to as a base station, a Node B, an access point, etc. Each eNB may provide communication coverage for a particular geographic area. The term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell, e.g., UEs belonging to a closed subscriber group (CSG). The CSG may include UEs for users in a home, UEs for users subscribing to a special service plan offered by a network operator, etc. An eNB for a macro cell may be referred to as a macro eNB. An eNB for a pico cell may be referred to as a pico eNB. An eNB for a femto cell may be referred to as a femto eNB or a home eNB.

Wireless network 100 may also include relay stations. A relay station is a station that receives a transmission of data and/or other information from an upstream station and sends a transmission of the data and/or other information to a downstream station. The upstream station may be an eNB, another relay station, or a UE. The downstream station may be a UE, another relay station, or an eNB.

A network controller 130 may couple to a set of eNBs and provide coordination and control for these eNBs. Network controller 130 may be a single network entity or a collection of network entities. Network controller 130 may communicate with eNBs 110 via a backhaul. eNBs 110 may also communicate with one another, e.g., directly or indirectly via wireless or wireline backhaul.

Wireless network 100 may be a homogeneous network that includes only macro eNBs. Wireless network 100 may also be a heterogeneous network that includes different types of eNBs, e.g., macro eNBs, pico eNBs, home eNBs, relays, etc. The techniques described herein may be used for homogeneous and heterogeneous networks.

UEs 120 may be dispersed throughout wireless network 100, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNBs, pico eNBs, femto eNBs, and/or other types of eNBs. In FIG. 1, a solid line with double arrows indicates desired transmissions between a UE and an eNB. A dashed line with double arrows indicates interfering transmissions between a UE and an eNB. In the description herein, a station may be a base station/eNB, a UE, or a relay station.

Wireless network 100 may utilize orthogonal frequency division multiplexing (OFDM) or single-carrier frequency division multiplexing (SC-FDM) for each of the downlink and uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 MHz, respectively.

For each link, the available time-frequency resources may be partitioned into resource blocks. Each resource block may cover S subcarriers in L symbol periods, e.g., S=12 subcarriers in L=7 symbol periods for a normal cyclic prefix in LTE. The available resource blocks may be used to send different channels.

Wireless network 100 may support a set of transport channels and a set of physical channels for each link. For example, in LTE, the transport channels for the downlink may include:

Broadcast Channel (BCH)—carry system information,
Paging Channel (PCH)—carry pages for UEs,
Multicast Channel (MCH)—carry multicast information, and
Downlink Shared Channel (DL-SCH)—carry traffic data sent to UEs.

The transport channels for the uplink in LTE may include:
Random Access Channel (RACH)—carry random access preambles sent by UEs to access the network, and
Uplink Shared Channel (UL-SCH)—carry traffic data sent by UEs.

The physical channels for the downlink in LTE may include:
Physical broadcast channel (PBCH)—carry the BCH,
Physical multicast channel (PMCH)—carry the MCH,
Physical downlink control channel (PDCCH)—carry control information for the DL-SCH and PCH and uplink scheduling grants, and
Physical downlink shared channel (PDSCH)—carry the DL-SCH and PCH.

The physical channels for the uplink in LTE may include:
Physical random access channel (PRACH)—carry the RACH,
Physical uplink control channel (PUCCH)—carry scheduling requests, CQI reports, and ACK information for data transmission on the downlink, and
Physical uplink shared channel (PUSCH)—carry the UL-SCH and may also carry inband CQI and ACK information.

Figure 2A:
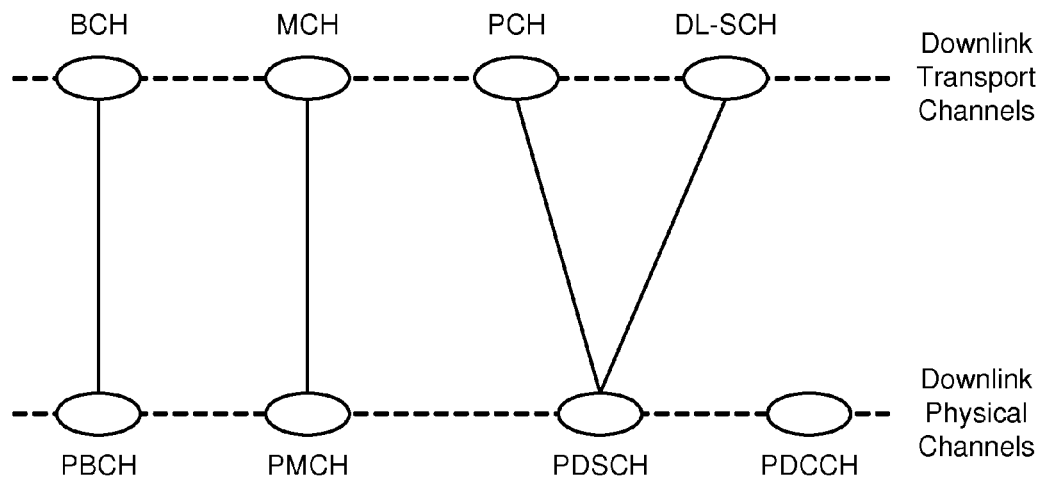
FIGS. 2A and 2B show example transport channels and physical channels.

FIG. 2A shows a mapping of downlink transport channels to downlink physical channels in LTE. The BCH may be mapped to the PBCH, the MCH may be mapped to the PMCH, and the PCH and DL-SCH may be mapped to the PDSCH.

Figure 2B:
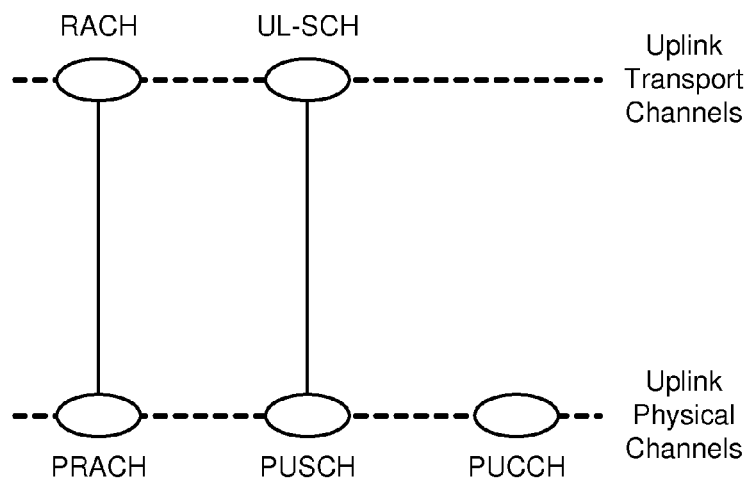

FIG. 2B shows a mapping of uplink transport channels to uplink physical channels in LTE. The RACH may be mapped to the PRACH, and the UL-SCH may be mapped to the PUSCH.

In LTE, the BCH, PBCH, PCH, RACH, PRACH, PDCCH and PUCCH may be considered as control channels. The DL-SCH, PDSCH, UL-SCH, PUSCH, MCH and PMCH may be considered as data channels. The DL-SCH and PDSCH may also be used to carry random access responses and may be considered as control channels when carrying these random access responses.

FIGS. 2A and 2B show some transport channels and physical channels that may be used for the downlink and uplink. Other transport channels and physical channels may also be used for each link.

In general, wireless network 100 may support one or more control channels for the downlink and one or more control channels for the uplink. A control channel is a channel carrying control information, which may comprise any information other than traffic data. Control information may include scheduling information, system information, broadcast information, paging information, etc. Control information may also be referred to as overhead information, signaling, etc. A control channel may be a physical channel (e.g., any of the downlink and uplink physical channels listed above possibly except for the PDSCH and PUSCH), a transport channel (e.g., any of the downlink and uplink transport channels listed above possibly except for the DL-SCH and UL-SCH), or some other type of channel. A control channel may also be referred to as a control transmission, a control signal, etc.

Figure 3:
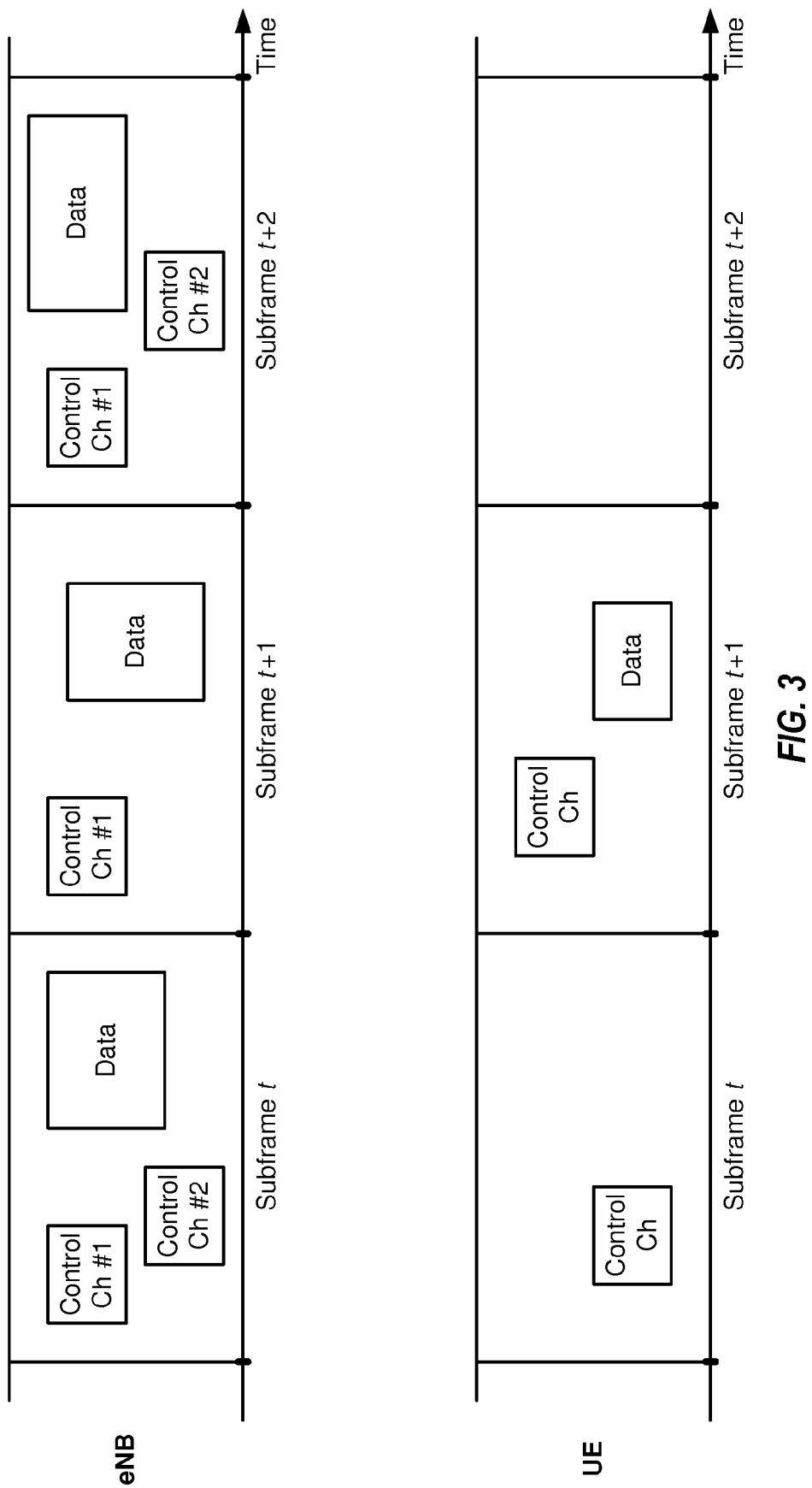
FIG. 3 shows example transmissions of data and control channels.

FIG. 3 shows example transmissions of data and control channels on the downlink and uplink. For each station, the horizontal axis may represent time, and the vertical axis may represent frequency. The transmission timeline for each link may be partitioned into units of subframes. Each subframe may have a predetermined duration, e.g., 1 millisecond (ms).

An eNB may transmit one or more control channels on the downlink. Each control channel may be transmitted on radio resources allocated for that control channel. In general, radio resources may be quantified by time, frequency, code, transmit power, etc. For example, radio resources may be quantified by resource blocks in LTE. Each control channel may be transmitted in each subframe or only certain subframes. Each control channel may also be transmitted at a fixed location in each subframe in which that control channel is transmitted or at different locations in different subframes. In the example shown in FIG. 3, the eNB transmits control channel #1 at a fixed location in each subframe and transmits control channel #2 at different locations in some subframes. The UEs and possibly other eNBs may know the radio resources used for each control channel transmitted by the eNB. The eNB may also transmit traffic data on radio resources not used for the control channels.

A UE may also transmit one or more control channels on the uplink. Each control channel may be transmitted in each subframe or only certain subframes and may be transmitted at a fixed location or different locations. The eNBs and possibly other UEs may know the radio resources used for each control channel transmitted by the UE. The UE may also transmit traffic data on assigned radio resources whenever the UE is scheduled for data transmission.

Wireless network 100 may include different types of eNBs, e.g., macro eNBs, pico eNBs, femto eNBs, etc. These different types of eNBs may transmit at different power levels, have different coverage areas, and have different impact on interference in wireless network 100. For example, macro eNBs may have a high transmit power level (e.g., 20 Watts) whereas pico and femto eNBs may have a low transmit power level (e.g., 1 Watt).

A UE may be within the coverage of multiple eNBs. One of these eNBs may be selected to serve the UE. The serving eNB may be selected based on various criteria such as geometry, pathloss, etc. Geometry may be quantified by a signal-to-noise ratio (SNR), a signal-to-noise-and-interference ratio (SINR), a carrier-to-interference ratio (C/I), etc.

The UE may operate in a dominant interference scenario in which the UE may observe high interference from one or more interfering eNBs and/or may cause high interference to one or more neighbor eNBs. High interference may be quantified by the observed interference exceeding a threshold or based on some other criteria. A dominant interference scenario may occur due to the UE connecting to an eNB with lower pathloss and lower geometry among the multiple eNBs detected by the UE. For example, the UE may detect two eNBs X and Y and may obtain lower received power for eNB X than eNB Y. Nevertheless, it may be desirable for the UE to connect to eNB X if the pathloss for eNB X is lower than the pathloss for eNB Y. This may be the case if eNB X (which may be a pico eNB) has much lower transmit power as compared to eNB Y (which may be a macro eNB). By having the UE connect to eNB X with lower pathloss, less interference may be caused to the wireless network to achieve a given data rate, and network capacity may be enhanced.

A dominant interference scenario may also occur due to restricted association. The UE may be close to eNB Y and may have high received power for eNB Y. However, the UE may not be able to access eNB Y due to restricted association and may connect to unrestricted eNB X with lower received power. The UE may then observe high interference from eNB Y and may also cause high interference to eNB Y.

The UE may need to receive one or more downlink control channels from a desired eNB in the presence of high interference from one or more interfering eNBs. The UE may also cause high interference on one or more uplink control channels at each interfering eNB.

In an aspect, high interference on radio resources used for a control channel may be mitigated by sending a request to reduce interference to one or more interfering stations. Each interfering station may reduce its transmit power on the radio resources, which may then allow the control channel to observe less interference. A reduce interference request may also be referred to as a special resource utilization message (RUM), a clearing resource utilization message (CRUM), a control blanking RUM, etc.

Figure 4:
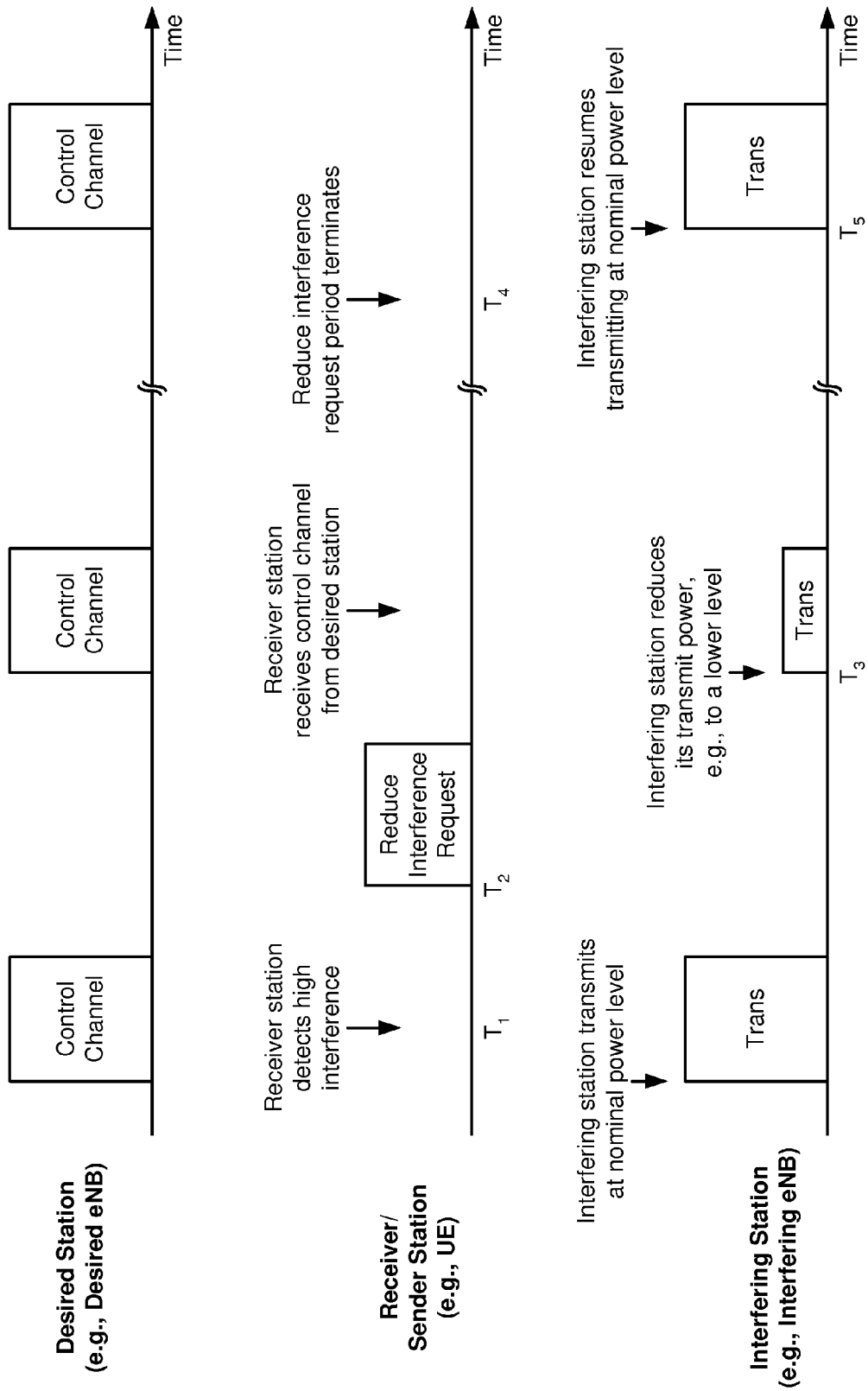
FIG. 4 shows control channel reception with interference mitigation.

FIG. 4 shows a design of control channel reception with interference mitigation. For each station, the horizontal axis may represent time, and the vertical axis may represent transmit power. A receiver station (e.g., a UE) may detect high interference on radio resources used for a control channel by a desired station (e.g., a desired eNB) at time $T_1$. The receiver station may be unable to correctly decode the control channel from the desired station due to the high interference. The receiver station may then send a reduce interference request to an interfering station (e.g., a neighbor eNB) at time $T_2$ to request the interfering station to reduce interference on the radio resources used for the control channel.

The interfering station may receive the reduce interference request from the receiver/sender station and may reduce its transmit power on the radio resources used for the control channel at time $T_3$. The receiver station may receive the control channel from the desired station at time $T_3$. The control channel may observe less or no interference from the interfering station and may be correctly decoded by the receiver station. The reduce interference request may be valid for a particular duration. The interfering station may then reduce its transmit power on the radio resources used for the control channel during the entire duration, which may end at time $T_4$. The interfering station may resume transmitting at the nominal power level on the radio resources used for the control channel starting at time $T_5$.

In general, reduce interference requests may be used to reduce interference on downlink control channels as well as uplink control channels. Reduce interference requests may also be used to reduce interference on one or more specific control channels or all control channels for a given link.

For interference mitigation on the downlink, a UE may send a reduce interference request (e.g., in a unicast message or a broadcast message) to one or more interfering eNBs to request reduction of interference on radio resources used for one or more downlink control channels from a desired eNB. Each interfering eNB may reduce its transmit power on the radio resources to allow the UE to receive the downlink control channel(s) from the desired eNB. An interfering eNB may be (i) a high-power macro eNB for a scenario in which the UE connects to a low-power pico eNB with lower pathloss and lower geometry, (ii) a femto eNB for a scenario in which the UE is close to the femto eNB but is unable to access this eNB due to restricted association, or (iii) an eNB causing interference in some other scenario.

For interference mitigation on the uplink, an eNB may send a reduce interference request (e.g., in a unicast message or a broadcast message) to one or more interfering UEs to request reduction of interference on radio resources used for one or more uplink control channels for this eNB. Each interfering UE may then reduce its transmit power on the radio resources to allow the eNB to receive the uplink control channel(s) from its UEs.

In one design, for both the downlink and uplink, the control channels may be divided into multiple control segments. Each eNB may be assigned a primary control segment. A UE may request interfering eNBs to reduce interference on the primary control segment of its desired eNBs on the downlink. The desired eNB may request interfering UEs to reduce interference on its primary control segment on the uplink.

Reduce interference requests may be used for various operating scenarios. In one design, reduce interference requests may be used for initial access. A UE may detect multiple eNBs, e.g., based on low reuse pilots/preambles (LRPs) or other synchronization signals transmitted by these eNBs. An LRP is a pilot sent with low reuse and/or high power so that it can be detected even by distant UEs observing high interference on the downlink. Low reuse refers to different eNBs using different resources (at least in part) for pilot transmission, thus improving pilot SNR by reducing interference and ensuring that even pilots of relatively weak eNBs can be detected. The other synchronization signals may comprise a primary synchronization signal and a secondary synchronization signal in LTE. The UE may desire to access an eNB with low pathloss and low geometry and may need to receive one or more downlink control channels (e.g., the PBCH) from this eNB. In one design, the UE may send a reduce interference request to interfering eNBs to request interference reduction on radio resources used for the downlink control channel(s) from the desired eNB. In one design, the UE may ask the interfering eNBs to send reduce interference requests to their UEs to request interference reduction on radio resources used for one or more uplink control channels (e.g., the PRACH) sent from the UE to the desired eNB. In one design, the UE may send a random access preamble to access the desired eNB. The interfering eNB may detect the random access preamble and may ask its interfering UEs to reduce interference on uplink control channel(s).

In one design, reduce interference requests may be used to reduce interference on the PDCCH and PHICH for the downlink and on the PUCCH for the uplink. The PDCCH and PHICH may be used to schedule downlink/uplink data. The downlink data may comprise a random access response (or an access grant) to the UE and downlink handshake messages. The uplink data may comprise uplink handshake messages. Interference may also be reduced for other downlink and uplink control channels for initial access.

In one design, a reduce interference request may be valid for a duration covering initial access. A long-term interference mitigation scheme may be used to allow the UE to communicate with the desired eNB after initial access. For example, a reduce interference request may be sent to reduce interference for a duration long enough to establish a connection and to negotiate longer-term interference mitigation, e.g., using backhaul communication between the desired eNB and interfering eNB(s). A reduce interference request may also be used to extend the duration of interference reduction. For example, a subsequent reduce interference request may be sent if backhaul negotiations for long-term interference mitigation are not completed before expiration of a prior reduce interference request.

Reduce interference requests may also be used during handover events and operation in a connected mode. A UE may send a reduce interference request to an interfering eNB to request interference reduction on radio resources used for one or more downlink control channels from a desired eNB. The desired eNB may be a target eNB during handover or a serving eNB in the connected mode. An interfering eNB may also send a reduce interference request to its UEs to request interference reduction on radio resources used for one or more uplink control channels sent from the UE to the desired eNB. The reduce interference requests may allow the UE to communicate with the desired eNB for handover or connected mode operation. For example, the UE may attempt to access a target eNB during handover and may ask interfering eNBs to reduce interference on radio resources used for a control channel carry an access grant from the target eNB. The interfering eNBs may reduce their transmit power to allow the UE to receive the access grant from the target eNB.

Reduce interference requests may also be used during operation in an idle mode. For example, the UE may be idle and may send a reduce interference request to ask interfering eNBs to reduce their transmit power on radio resources used for transmission of pages and system information by a serving eNB. The UE may send the reduce interference request in every wakeup cycle or every few wakeup cycles. The interfering eNBs may reduce their transmit power on the radio resources to allow the UE to receive system information and monitor for pages from the serving eNB. Reduce interference requests may also be used for other operating scenarios.

In one design, a reduce interference request may be sent as a unicast message to a specific UE or eNB, which may be a dominant interferer. This may be achieved by including a UE identity (ID) or a cell ID in the request. The specific UE or eNB may act on the request, and all other UEs or eNBs may ignore the request.

In another design, a reduce interference request may be sent as a multicast message to a set of UEs or eNBs. This may be achieved by including individual UE IDs or cell IDs in the set, or a group ID for the set, in the request. Each UE or eNB in the set may act on the request, and all other UEs or eNBs may ignore the request.

In yet another design, a reduce interference request may be sent as a broadcast message to all UEs or eNBs within reception range of the request. Each UE or eNB that can receive the request may act on the request.

An interfering station that is an intended recipient of a reduce interference request may act on the request in various manners. In one design, the interfering station may decide whether to honor or dismiss the request. This decision may be based on various factors such as the priority of the request, the importance of the control channel(s) for which reduced interference is requested, network loading, etc. The interfering station may honor the request by reducing its transmit power on the radio resources used for the control channel(s). The interfering station may reduce its transmit power on the radio resources to a lower level (e.g., as shown in FIG. 4) or to zero (i.e., blank transmission on the radio resources). The interfering station may also spatially steer its transmission in a manner to reduce interference on the radio resources. For example, the interfering station may perform precoding to place a spatial null in the direction of the sender station observing high interference.

In one design, a reduce interference request may convey the transmit power level of the request and a target interference level on radio resources used for one or more control channels. An interfering station may then reduce its transmit power such that the sender station can observe the target interference level on the radio resources. The interfering station may estimate the pathloss to the sender station based on the transmit power level of the request (which may be conveyed by the request) and the received power level of the request (which may be measured by the interfering station). The interfering station may then reduce its transmit power on the radio resources accordingly. If the interfering station receives the reduce interference request at very high power, then it may be close to the sender station and hence may be a dominant interferer. In this case, the interfering station may reduce its transmit power substantially on the radio resources. The converse may be true if the interfering station receives the request at low power.

In one design, a reduce interference request may indicate one or more specific control channels to reduce interference. The radio resources used for the specified control channel(s) may be known by an interfering station. In another design, a reduce interference request may indicate specific radio resources on which to reduce interference. An interfering station may then reduce its transmit power on the specified radio resources. In yet another design, a reduce interference request may provide information used to determine radio resources used for one or more control channels. For example, a desired eNB may send a control channel on different radio resources determined based on a hopping function and a cell ID. The reduce interference request may provide the cell ID. The interfering eNB may be able to ascertain the radio resources used for the control channel based on the cell ID provided by the request and the known hopping function. A reduce interference request may also provide other information used to determine radio resources used for control channel(s).

In one design, an interfering station may reduce its transmit power on only the radio resources used for one or more control channels indicated by a reduce interference request. The interfering station may transmit on other radio resources not used for the control channel(s). In another design, the interfering station may reduce its transmit power during a time interval covering the radio resources used for the control channel(s). For example, the control channel(s) may be sent on radio resources covering S subcarriers in L symbol periods. The interfering station may reduce (e.g., blank) its transmit power on all subcarriers in the L symbol periods. The interference from the interfering station may be so high that it may desensitize (or desens) a receiver at the sender station. This design may avoid desensitization of the receiver. In yet another design, the interfering station may reduce its transmit power on one or more interlaces including the radio resources used for the control channel(s). Each interlace may include every Q-th subframes in the transmission timeline, there Q may be equal to 4, 6, 8 or some other value. In general, the interfering station may reduce its transmit power on the radio resources used for the control channel(s) and possibly additional radio resources, depending on other considerations.

In one design, a reduce interference request may be valid for a predetermined duration (e.g., 100 ms), which may be known a priori by both a sender station and an interfering station. In another design, a reduce interference request may indicate the duration over which it is valid. An interfering station may honor the reduce interference request for the specified duration or may counter with a different duration. In yet another design, a reduce interference request may be valid for a duration that may be dependent on one or more parameters for the request. Reduce interference requests for different control channels or different operating scenarios may be associated with different durations for which the requests are valid. For example, a reduce interference request for a paging channel may be valid for an amount of time in which a page might be sent to a UE. A reduce interference request for a control channel carrying an access grant may be valid for an amount of time in which initial access is performed. In yet another design, a reduce interference request may be valid indefinitely until it is revoked.

A reduce interference request may be sent in a manner to ensure reliable reception of the request by an interfering station. In one design, the reduce interference request may be repeated and sent multiple times to improve reception of the request. In another design, the reduce interference request may be sent at progressively higher transmit power with power ramping to ensure that the request can reach the interfering station. In yet another design, a cyclic redundancy check (CRC) may be generated for the request and appended to the request. The interfering station may use the CRC to determine whether the request is received correctly. The CRC may reduce false alarm rate. In yet another design, the reduce interference request may be sent via Layer-3 signaling, which may be particularly applicable to renew interference reduction on radio resources used for control channels. The reduce interference request may also be sent in other manners to ensure reliable reception, which may be desirable since the request may trigger reduction of transmit power for an extended period of time.

FIG. 5 shows a design of a process 500 for sending a reduce interference request in a wireless communication network. Process 500 may be performed by a sender station, which may be a UE or a base station, e.g., an eNB, a relay station, etc.

The sender station may detect high interference on radio resources used for a control channel by a desired station (block 512). The control channel may comprise any of the channels described above for LTE or other channels in other radio technologies. The sender station may generate a request to reduce interference on the radio resources used for the control channel (block 514) and may send the request to an interfering station (block 516). In one design, the sender station may identify the interfering station and may send the request as a unicast message to only the interfering station. In another design, the sender station may send the request as a broadcast message to the interfering station as well as other interfering stations within reception range of the request. In any case, the sender station may receive the control channel on the radio resources from the desired station (block 518). In general, the request may be applicable for one control channel or multiple control channels. The sender station may send a second request to extend interference reduction on the radio resources, if needed.

For interference mitigation on the downlink, the sender station may be a UE. In one design, the interfering station may be a macro base station with a high transmit power level, and the desired station may be a pico or femto base station with a low transmit power level. In another design, the interfering station may be a femto base station with restricted access, and the desired station may be a pico or macro base station with unrestricted access. The UE may detect the interfering base station based on an LRP or a synchronization signal sent by the base station.

For interference mitigation on the uplink, the sender station may be a base station, the interfering station may be a first UE not served by the base station, and the desired station may be a second UE served by the base station. The sender station, the interfering station, and the desired station may also be other stations in the wireless network.

In one design, the sender station may generate the request to include a transmit power level of the request, a target interference level for the radio resources used for the control channel, an identity of the interfering station, an identity of the desired station, information identifying the control channel or the radio resources, the duration over which the request is valid, the priority of the request, other information, or any combination thereof.

In one design, the sender station may generate a CRC for the request and may append the CRC to the request. The CRC may be used by the interfering station to detect for error in receiving the request. In one design, the sender station may send the request only once but in a manner (e.g., with a lower code rate) to ensure reliable reception of the request. In another design, the sender station may send the request multiple times to improve reception of the request by the interfering station. The sender station may send the request at higher transmit power after each time to further improve reception.

In one design, the request may be sent by a UE during initial access, and the control channel may carry an access grant for the UE. In another design, the request may be sent by a UE operating in an idle mode, and the control channel may comprise a paging channel and/or a broadcast channel. In yet another design, the request may be sent during handover of a UE or during operation in a connected mode by the UE. The UE may communicate with a serving base station via the control channel for interference mitigation for data transmission. The request may also be sent for other operating scenarios.

In one design, a UE may send the request to an interfering base station, as described above. In another design, the UE may send the request to its serving base station, which may forward the request to the interfering base station via the backhaul. The interfering base station may reserve radio resources in response to the request and may send the reserved radio resources to the serving base station, which may forward the information to the UE. In yet another design, the serving base station and the interfering base station may communicate via the backhaul to reserve downlink and/or uplink radio resources, without a trigger or a request from the UE.

FIG. 6 shows a design of an apparatus 600 for sending a reduce interference request. Apparatus 600 includes a module 612 to detect high interference on radio resources used for a control channel by a desired station, a module 614 to generate a request to reduce interference on the radio resources used for the control channel, a module 616 to send the request to an interfering station, and a module 618 to receive the control channel on the radio resources from the desired station.

FIG. 7 shows a design of a process 700 for receiving a reduce interference request in a wireless communication network. Process 700 may be performed by an interfering station, which may be a UE or a base station. The interfering station may receive from a sender station a request to reduce interference on radio resources used for a control channel by a desired station (block 712). The interfering station may determine the radio resources used for the control channel based on information sent in the request, a known hopping pattern and an identity of the desired station, etc.

The interfering station may reduce its transmit power on the radio resources to reduce interference to the control channel from the desired station (block 714). In one design of block 714, the interfering station may reduce its transmit power on the radio resources to a lower level or zero. In one design, the interfering station may determine the pathloss from the sender station to the interfering station based on a transmit power level and a received power level of the request. The interfering station may then determine its transmit power for the radio resources based on the pathloss and a target interference level for the radio resources. In another design of block 714, the interfering station may steer a transmission on the radio resources away from the sender station. For all designs, the interfering station may reduce its transmit power for a predetermined duration, a duration indicated by the request, or a duration determined based on at least one parameter for the request, e.g., the control channel, the operating scenario, etc.

For interference mitigation on the downlink, the sender station may be a UE. In one design, the interfering station may be a macro base station having a high transmit power level, and the desired station may be a pico or femto base station having a low transmit power level. In another design, the interfering station may be a femto base station with restricted access, and the desired station may be a pico or macro base station with unrestricted access. For interference mitigation on the uplink, the sender station may be a base station, the interfering station may be a first UE not served by the base station, and the desired station may be a second UE served by the base station. The sender station, the interfering station, and the desired station may also be other stations in the wireless network.

FIG. 8 shows a design of an apparatus 800 for receiving a reduce interference request. Apparatus 800 includes a module 812 to receive from a sender station a request to reduce interference on radio resources used for a control channel by a desired station, and a module 814 to reduce transmit power of an interfering station on the radio resources to reduce interference to the control channel from the desired station.

The modules in FIGS. 6 and 8 may comprise processors, electronics devices, hardware devices, electronics components, logical circuits, memories, software codes, firmware codes, etc., or any combination thereof.

Figure 9:
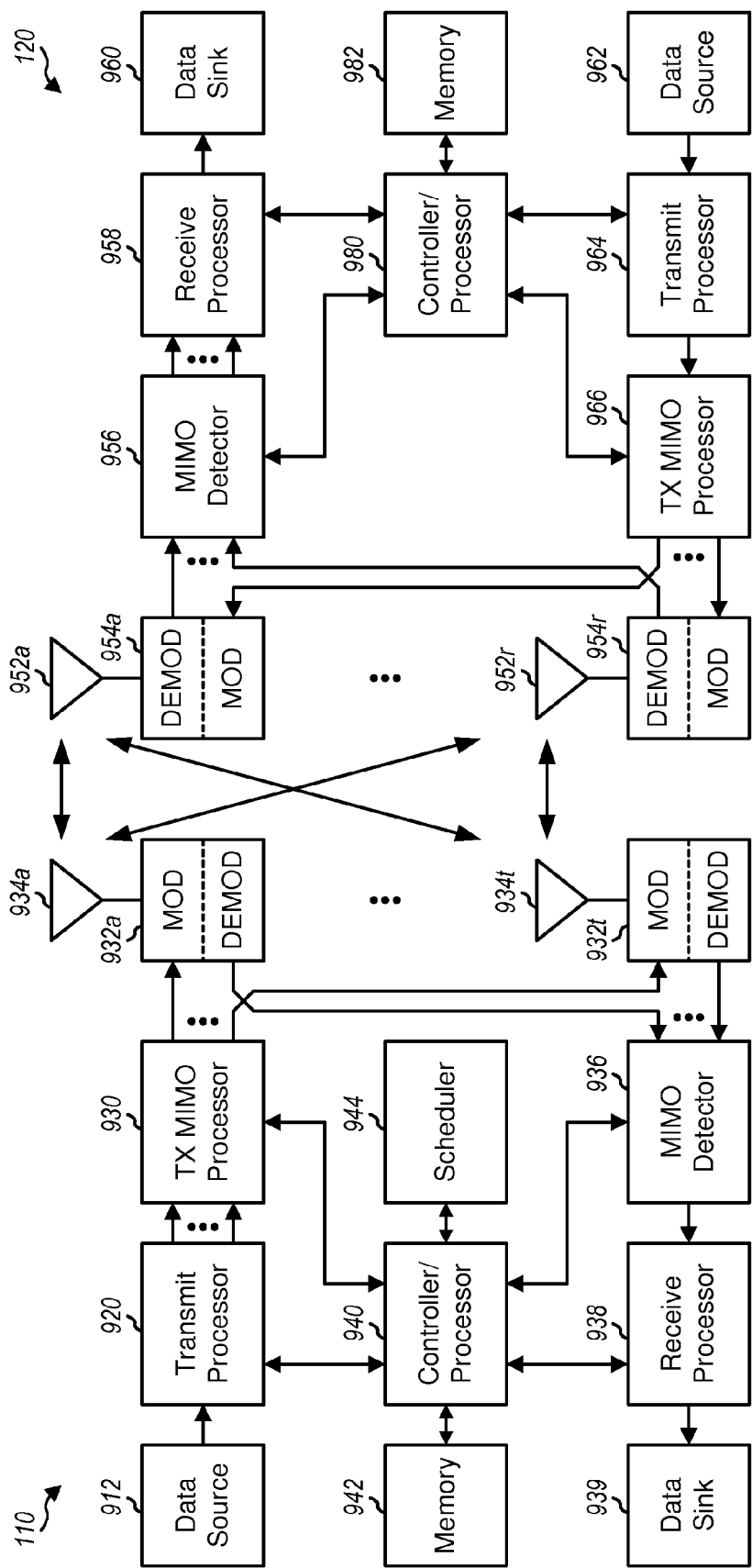
FIG. 9 shows a block diagram of a base station and a UE.

FIG. 9 shows a block diagram of a design of a base station/eNB 110 and a UE 120, which may be one of the base stations/eNBs and one of the UEs in FIG. 1. In this design, base station 110 is equipped with T antennas 934a through 934t, and UE 120 is equipped with R antennas 952a through 952r, where in general T≥1 and R≥1.

At base station 110, a transmit processor 920 may receive data for one or more UEs from a data source 912, process (e.g., encode, interleave, and modulate) the data, and provide data symbols. Transmit processor 920 may also receive information for control channels and possibly reduce interference requests from a controller/processor 940, process the information, and provide control symbols. A transmit (TX) multiple-input multiple-output (MIMO) processor 930 may perform spatial processing (e.g., precoding) on the data symbols, the control symbols, and/or pilot symbols, if applicable, and may provide T output symbol streams to T modulators (MODs) 932a through 932t. Each modulator 932 may process a respective output symbol stream (e.g., for OFDM, etc.) to obtain an output sample stream. Each modulator 932 may further process (e.g., convert to analog, amplify, filter, and upconvert) the output sample stream to obtain a downlink signal. T downlink signals from modulators 932a through 932t may be transmitted via T antennas 934a through 934t, respectively.

At UE 120, antennas 952a through 952r may receive the downlink signals from base station 110 and may provide received signals to demodulators (DEMODs) 954a through 954r, respectively. Each demodulator 954 may condition (e.g., filter, amplify, downconvert, and digitize) a respective received signal to obtain received samples. Each demodulator 954 may further process the received samples (e.g., for OFDM, etc.) to obtain received symbols. A MIMO detector 956 may obtain received symbols from all R demodulators 954a through 954r, perform MIMO detection on the received symbols if applicable, and provide detected symbols. A receive processor 958 may process (e.g., demodulate, deinterleave, and decode) the detected symbols, provide decoded data for UE 120 to a data sink 960, and provide decoded information for control channels and reduce interference requests to a controller/processor 980.

On the uplink, at UE 120, a transmit processor 964 may receive and process data from a data source 962 and information for control channels and possibly reduce interference requests from controller/processor 980. The symbols from transmit processor 964 may be precoded by a TX MIMO processor 966 if applicable, further processed by modulators 954a through 954r, and transmitted to base station 110. At base station 110, the uplink signals from UE 120 may be received by antennas 934, processed by demodulators 932, detected by a MIMO detector 936 if applicable, and further processed by a receive processor 938 to obtain the data and information sent by UE 120.

Controllers/processors 940 and 980 may direct the operation at base station 110 and UE 120, respectively. Processor 940 and/or other processors and modules at base station 110 may perform or direct process 500 in FIG. 5 to request reduced interference on the uplink, process 700 in FIG. 7 to reduce interference on the downlink, and/or other processes for the techniques described herein. Processor 980 and/or other processors and modules at UE 120 may perform or direct process 500 in FIG. 5 to request reduced interference on the downlink, process 700 in FIG. 7 to reduce interference on the uplink, and/or other processes for the techniques described herein. Memories 942 and 982 may store data and program codes for base station 110 and UE 120, respectively. A scheduler 944 may schedule UEs for data transmission on the downlink and uplink and may provide resource grants for the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   receiving a first request, at a first user equipment (UE), to reduce interference on uplink radio resources used for communication with a base station, wherein the first request is based on a second request originating at a second UE and received at the base station;
   reducing transmit power of the first UE on the uplink radio resources to reduce interference;
   wherein at least one of the first UE is not served by the base station or the second UE is not served by the base station; and
      wherein the second request is an initial access request or a handover request.

2. The method of claim 1, wherein the second request is based on: a pathloss from the second UE to the base station based on a transmit power level and a received power level of the second request, and
   a transmit power of the first UE on the uplink radio resources based on the pathloss and a target interference level for the uplink radio resources.

3. The method of claim 1, wherein the reducing transmit power comprises reducing transmit power of the first UE on the uplink radio resources to a lower level or zero.

4. The method of claim 1, wherein the reducing transmit power comprises steering a transmission from the first UE on the uplink radio resources away from the base station.

5. The method of claim 1, wherein the reducing transmit power comprises reducing the transmit power of the first UE on the uplink radio resources for a predetermined duration, a duration indicated by the request, or a duration determined based on at least one parameter with the first request.

6. The method of claim 1, further comprising: determining the uplink radio resources used for the communication with the base station based on a hopping pattern and an identity of the base station.

7. An apparatus for wireless communication, comprising:
   a memory; and
   at least one processor coupled to the memory, and configured to
      receive at first request, at a first user equipment (UE), to reduce interference on uplink radio resources used for the communication with a base station, wherein the first request is based on a second request originating from a second UE and received at the base station,
   reduce transmit power of the first UE on the uplink radio resources to reduce interference;
   wherein at least one of the first UE is not served by the base station or the second UE is not served by the base station; and
      wherein the second request is an initial access request or a handover request.

8. The apparatus of claim 7, wherein the second request is based on:
   a pathloss from the first UE to the second UE based on a transmit power level and a received power level of the first request, and
   a transmit power of the second UE on the uplink radio resources based on the pathloss and a target interference level for the uplink radio resources.

9. The apparatus of claim 7, wherein the at least one processor is configured to reduce transmit power of the first UE on the uplink radio resources to a lower level or zero.

10. The apparatus of claim 7, wherein the at least one processor is configured to steer a transmission from the first UE on the uplink radio resources away from the base station.

11. The apparatus of claim 7, wherein the at least one processor is configured to reduce the transmit power of the first UE on the uplink radio resources for a predetermined duration, a duration indicated by the request, or a duration determined based on at least one parameter with the first request.

12. The apparatus of claim 7, wherein the at least one processor is configured to determine the uplink radio resources used by the base station based on a hopping pattern and an identity of the base station.

13. The apparatus of claim 7, wherein the first UE is not served by the base station, and the second UE is served by the base station.

14. An apparatus for wireless communication, comprising:
   means for receiving a first request, at a first user equipment (UE), a request to reduce interference on uplink radio resources used for communication with a base station, wherein the first request is based on a second request originating at a second UE and received at the base station;
   means for reducing transmit power of the first UE on the uplink radio resources to reduce interference;
   wherein at least one of the first UE is not served by the base station or the second UE is not served by the base station;
      wherein the second request is an initial access request or a handover request.

15. The apparatus of claim 14, wherein the second request is based on:
   a pathloss from second UE to the base station based on a transmit power level and a received power level of the second request, and
   a transmit power of the first UE on the uplink radio resources based on the pathloss and a target interference level for the uplink radio resources.

16. The apparatus of claim 14, wherein the means for reducing transmit power comprises means for reducing transmit power of the first UE on the uplink radio resources to a lower level or zero.

17. The apparatus of claim 14, wherein the means for reducing transmit power comprises means for steering a transmission from the first UE on the uplink radio resources away from the base station.

18. The apparatus of claim 14, wherein the means for reducing transmit power comprises means for reducing the transmit power of the first UE on the uplink radio resources for a predetermined duration, a duration indicated by the first request, or a duration determined based on at least one parameter associated with the first request.

19. The apparatus of claim 14, further comprising:
means for determining the uplink radio resources used by the base station based on a hopping pattern and an identity of the base station.

20. A computer program product, stored on a non-transitory computer-readable medium, comprising code for causing at least one computer to:
receive a first request, at a first user equipment (UE), to reduce interference on uplink radio resources used for communication with a base station, wherein the first request is based on a second request originating from a second UE and received at the base station;
reduce transmit power of the first UE on the uplink radio resources to reduce interference;
wherein at least one of the first UE is not served by the base station or the second UE is not served by the base station;
wherein the second request is an initial access request or a handover request.

\* \* \* \* \*

UNITED STATES PATENT AND TRADEMARK OFFICE
CERTIFICATE OF CORRECTION

PATENT NO. : 9,648,596 B2
APPLICATION NO. : 13/908951
DATED : May 9, 2017
INVENTOR(S) : Ravi Palanki et al.

Page 1 of 1

It is certified that error appears in the above-identified patent and that said Letters Patent is hereby corrected as shown below:

On the Title Page

Item (63) Related U.S. Application Data should read:

Continuation of application No. 12/359,989, filed on Jan. 26, 2009, now Pat. No. 8,504,091.
Provisional application No. 61/025,644, filed on Feb. 1, 2008, provisional application No. 61/080,039, filed on Jul. 11, 2008.

Signed and Sealed this
Twenty-sixth Day of December, 2017

Joseph Matal
*Performing the Functions and Duties of the
Under Secretary of Commerce for Intellectual Property and
Director of the United States Patent and Trademark Office*